(12) United States Patent
Bradfield

(10) Patent No.: US 9,577,501 B2
(45) Date of Patent: Feb. 21, 2017

(54) CLAW POLE ROTOR WITH CAVITY FOR MINIMIZING FLUX LEAKAGE

(71) Applicant: Remy Technologies, LLC, Pendleton, IN (US)

(72) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 612 days.

(21) Appl. No.: 14/085,241

(22) Filed: Nov. 20, 2013

(65) Prior Publication Data

US 2014/0300234 A1     Oct. 9, 2014

Related U.S. Application Data

(60) Provisional application No. 61/808,991, filed on Apr. 5, 2013.

(51) Int. Cl.

| | |
|---|---|
| H02K 21/04 | (2006.01) |
| H02K 3/32 | (2006.01) |
| H02K 3/52 | (2006.01) |
| H02K 1/22 | (2006.01) |
| H02K 1/24 | (2006.01) |

(52) U.S. Cl.
CPC ............ *H02K 21/044* (2013.01); *H02K 1/226* (2013.01); *H02K 1/243* (2013.01); *H02K 3/325* (2013.01); *H02K 3/528* (2013.01); *H02K 21/048* (2013.01)

(58) Field of Classification Search
CPC ........ H02K 1/226; H02K 1/243; H02K 1/145; H02K 1/27; H02K 3/325; H02K 3/525; H02K 3/528; H02K 15/022; H02K 21/044; H02K 21/048

USPC .............. 310/156.66, 156.71, 156.73, 263, 156.48, 310/156.69
See application file for complete search history.

(56) References Cited

U.S. PATENT DOCUMENTS

| | | | |
|---|---|---|---|
| 3,484,635 A | 12/1969 | MacKallor, Jr. | |
| 4,959,577 A | * 9/1990 | Radomski ............ | H02K 21/044 |
| | | | 310/156.66 |
| 5,543,676 A | 8/1996 | York et al. | |
| 5,552,651 A | 9/1996 | Radomski | |
| 5,578,885 A | 11/1996 | Alford et al. | |
| 5,747,913 A | 5/1998 | Amlee et al. | |
| 5,892,313 A | 4/1999 | Harris et al. | |
| 6,144,138 A | 11/2000 | Ragaly | |
| 6,469,408 B2 | 10/2002 | Asao | |

(Continued)

*Primary Examiner* — Joshua Benitez-Rosario
*Assistant Examiner* — Alexander Singh
(74) *Attorney, Agent, or Firm* — Bose McKinney & Evans LLP

(57) ABSTRACT

A rotor for a rotary electric machine, the rotor including first and second pole pieces each having a respective magnetic hub arranged for rotation about an axis along which they are spaced. Pluralities of magnetic first and second pole fingers are spaced from each other and extend between the hubs. Each pole finger has a proximal end connected to its respective hub, and an axially opposite distal end. The first and second pole fingers circumferentially alternate about the axis, and each pole finger has a respective radially inner surface defining a cavity that extends axially from the distal end to a cavity terminus. Relative to each pole finger, at a respective axial position between the distal end and the cavity terminus the radial distance between the axis and the radially inner surface is substantially greater inside of the cavity than outside of the cavity.

25 Claims, 13 Drawing Sheets

(56) References Cited

U.S. PATENT DOCUMENTS

| | | |
|---|---|---|
| 6,548,935 B1 | 4/2003 | Shendi et al. |
| 6,703,758 B2 | 3/2004 | Buening et al. |
| 6,806,617 B1 | 10/2004 | Chen et al. |
| 6,903,485 B2 | 6/2005 | Chen et al. |
| 6,989,622 B1 | 1/2006 | Chen et al. |
| 7,605,511 B2 | 10/2009 | Oowatari et al. |
| 7,973,444 B2 | 7/2011 | Bradfield |
| 2013/0113323 A1* | 5/2013 | Yamada ............... H02K 1/2706 310/156.07 |

* cited by examiner

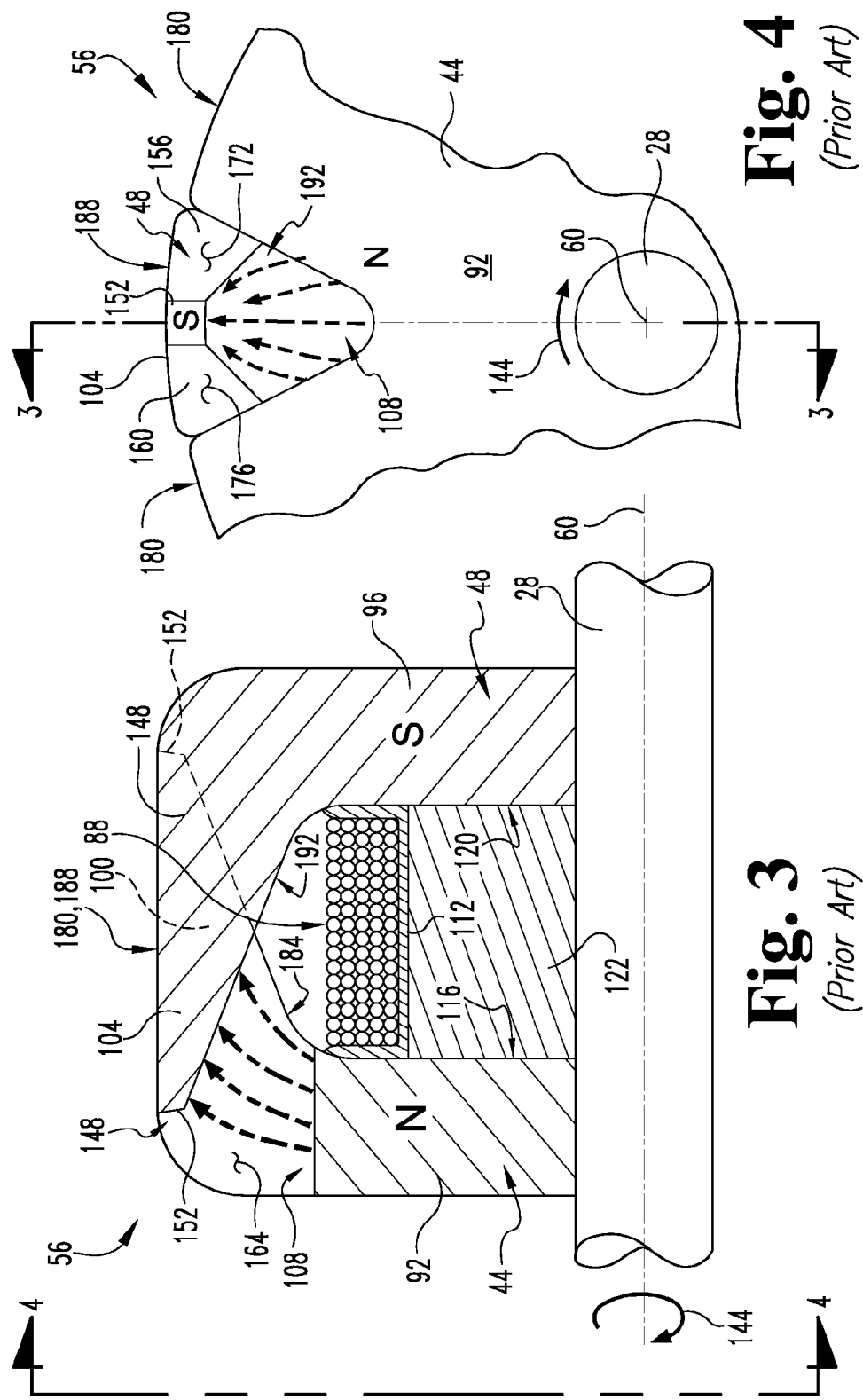

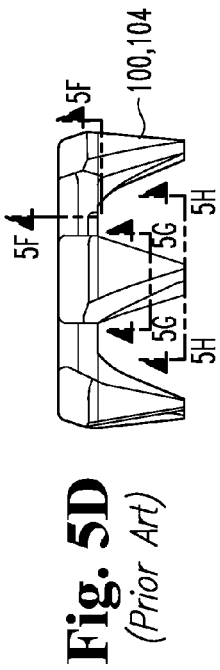
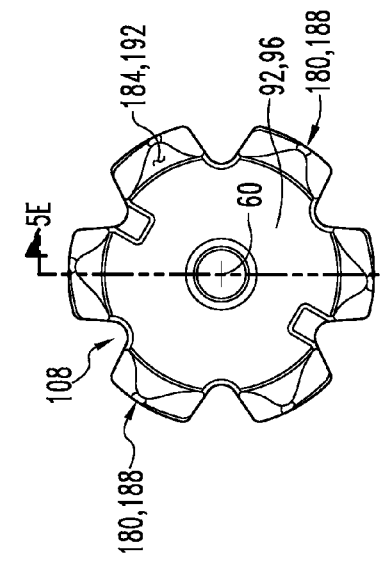
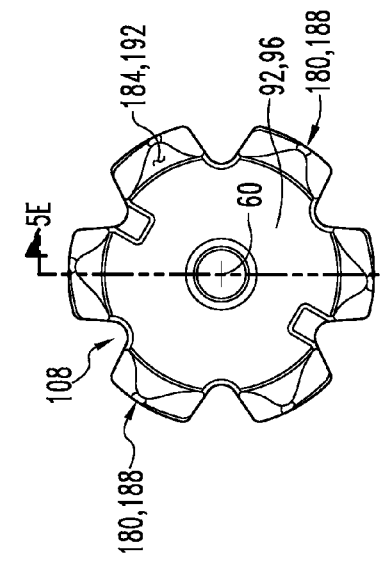
Fig. 5A *(Prior Art)*
Fig. 5D *(Prior Art)*
Fig. 5C *(Prior Art)*
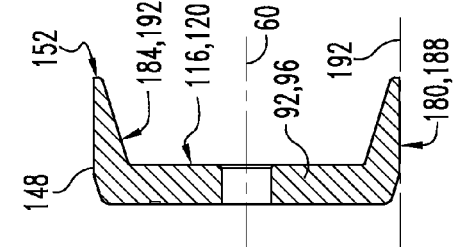
Fig. 5H *(Prior Art)*
Fig. 5E *(Prior Art)*
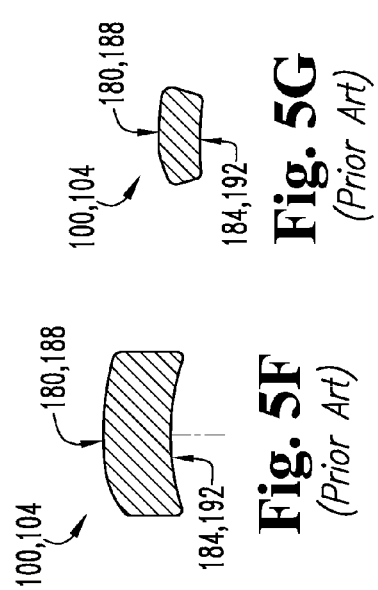
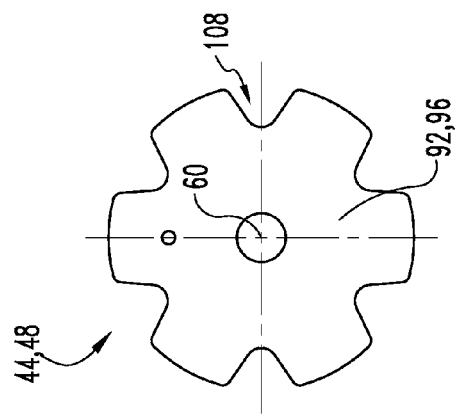
Fig. 5F *(Prior Art)*
Fig. 5G *(Prior Art)*
Fig. 5B *(Prior Art)*

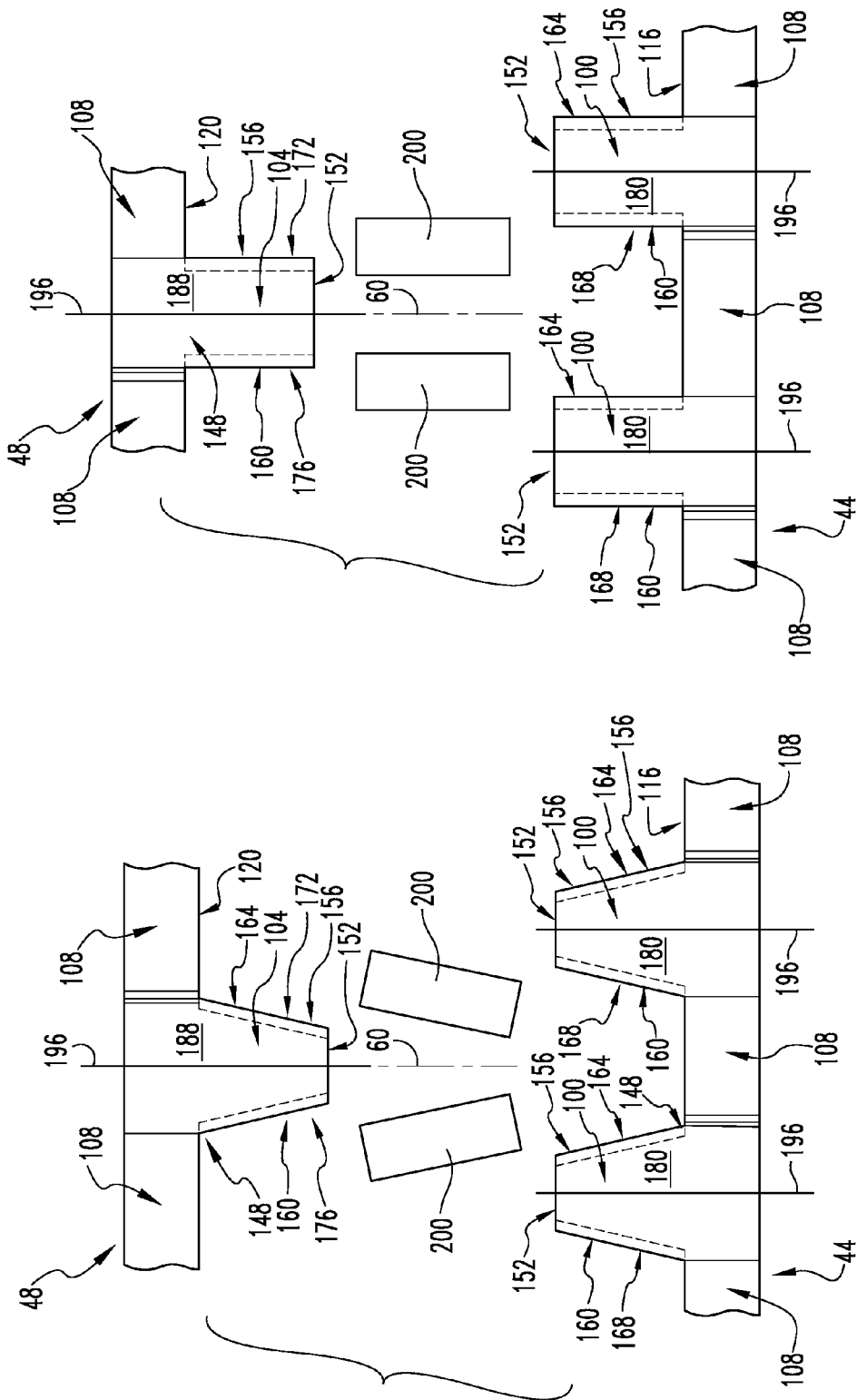

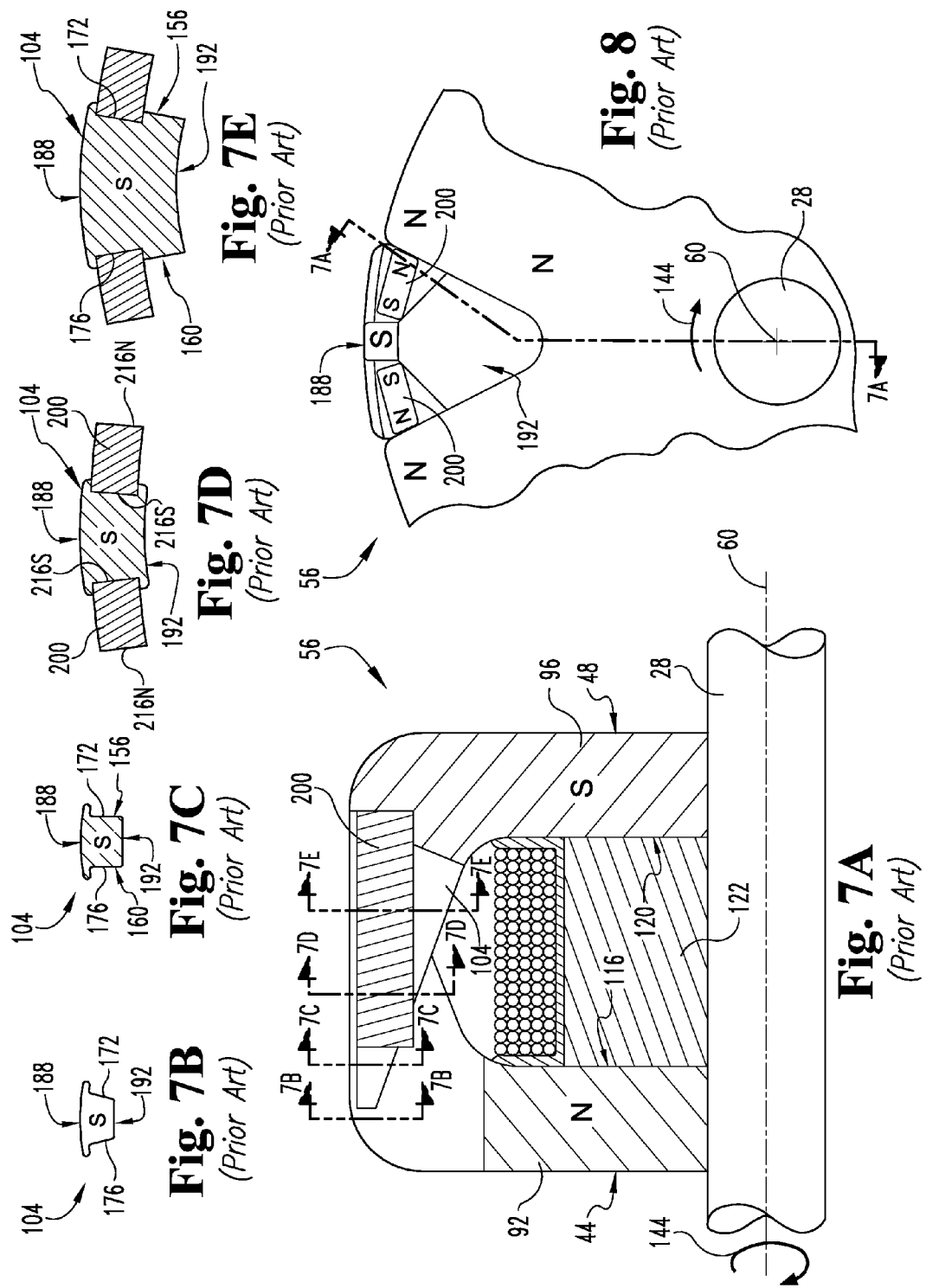

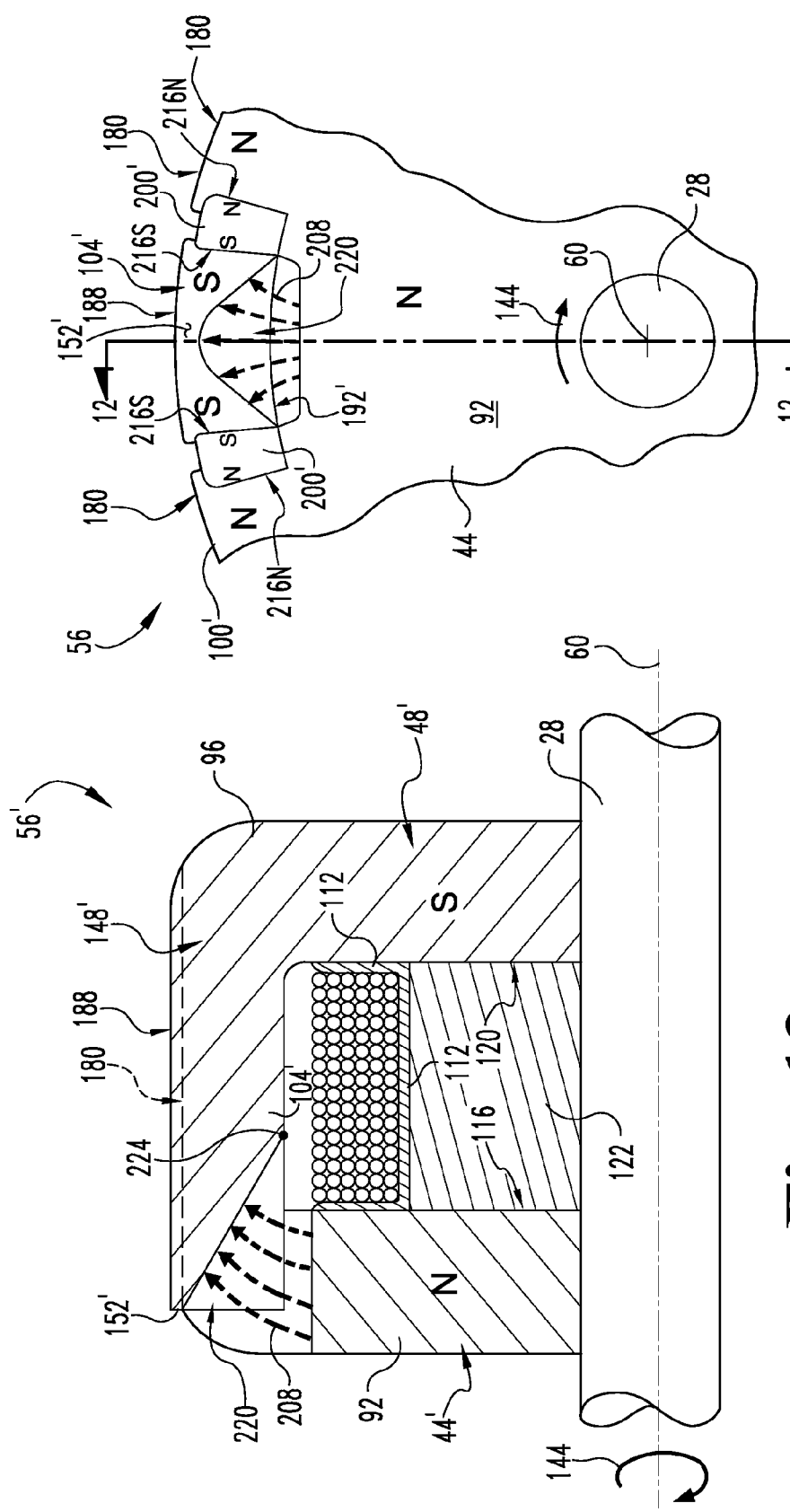

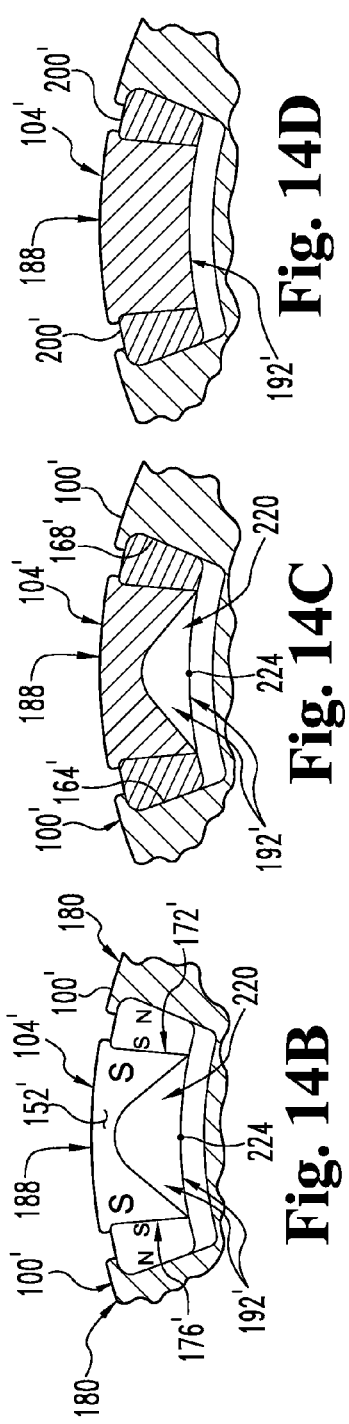
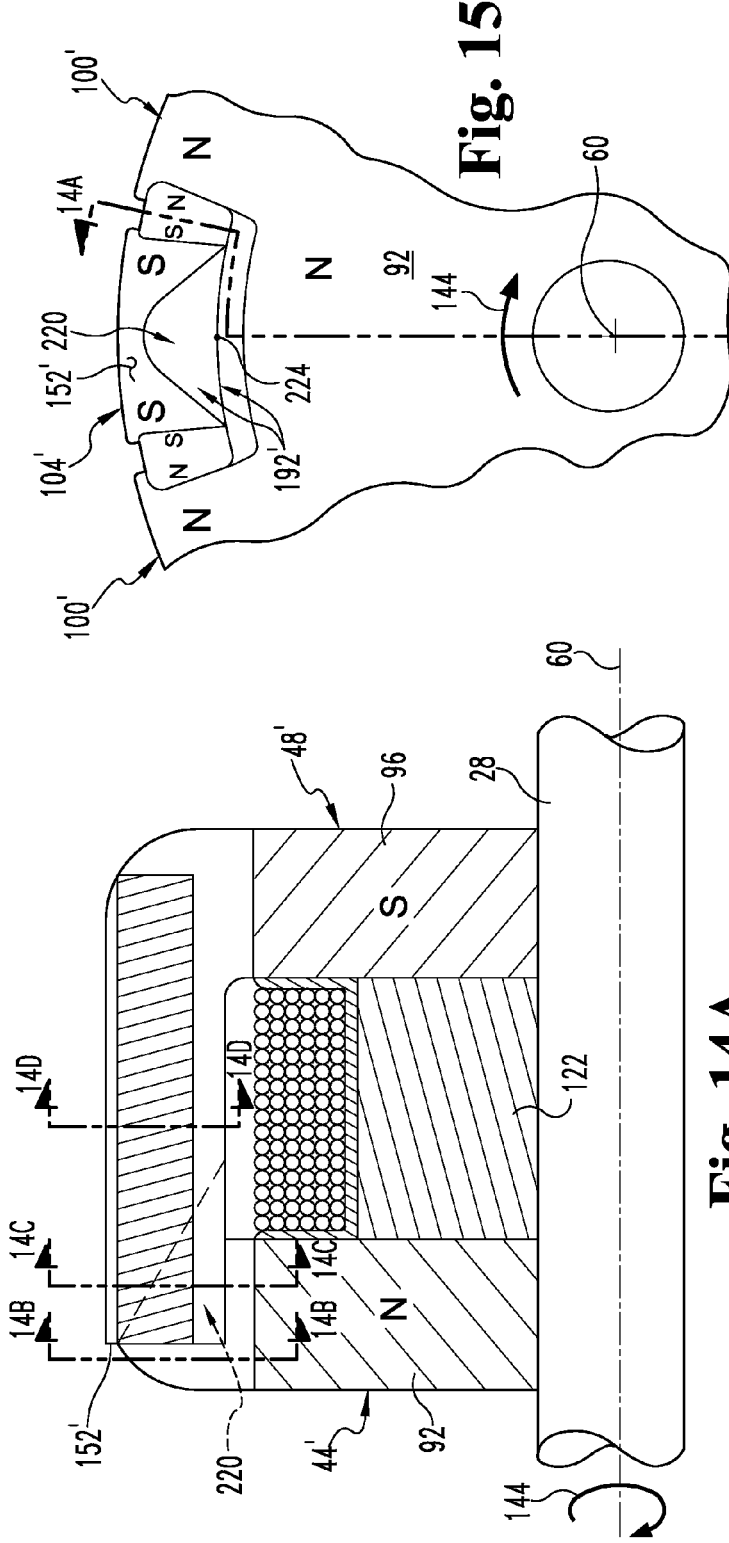

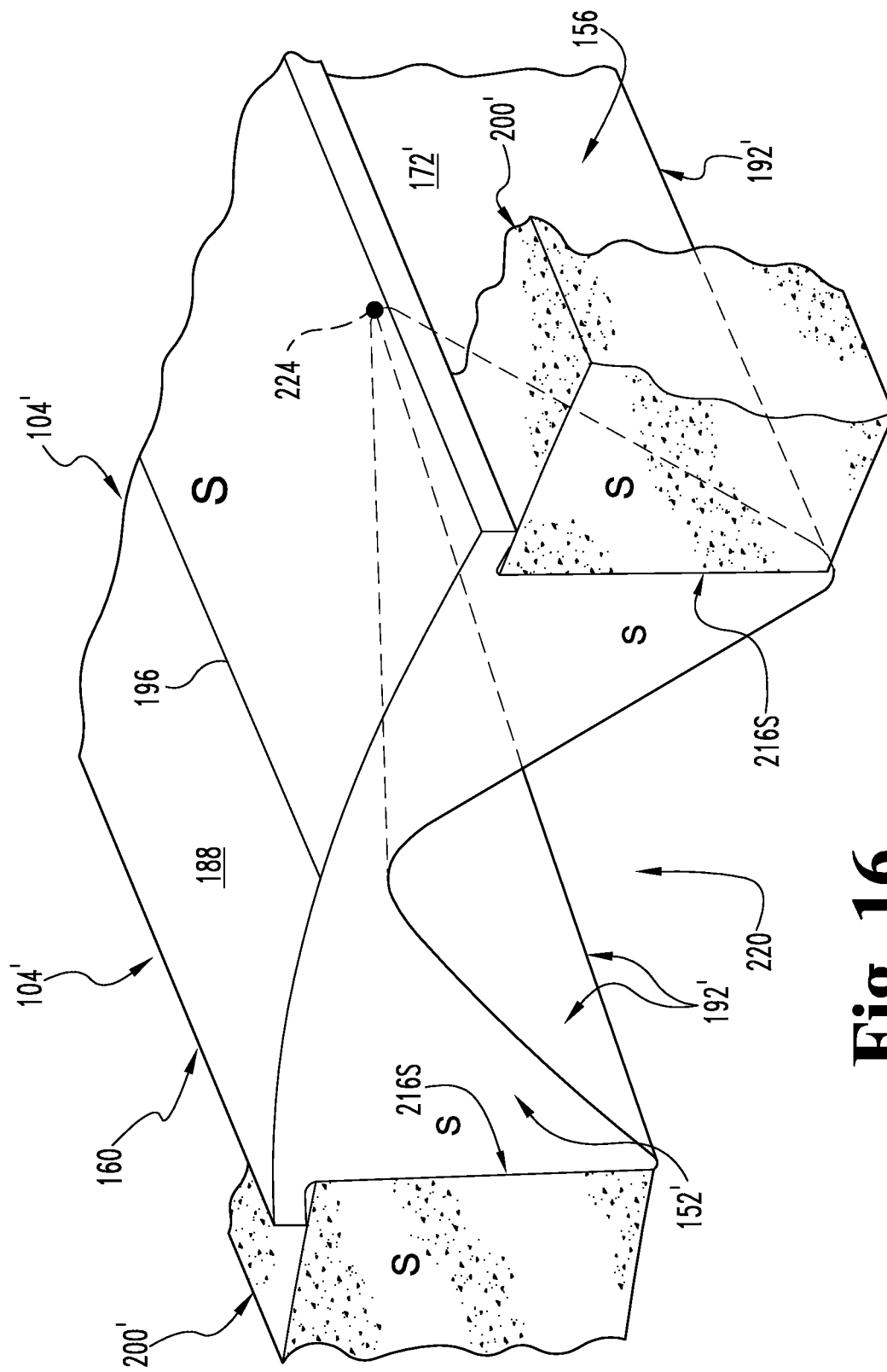

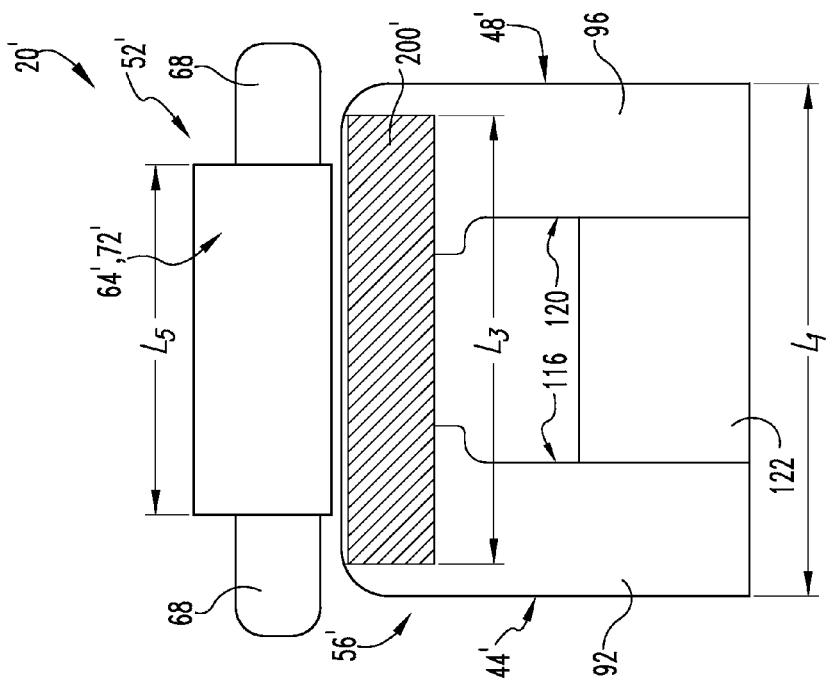
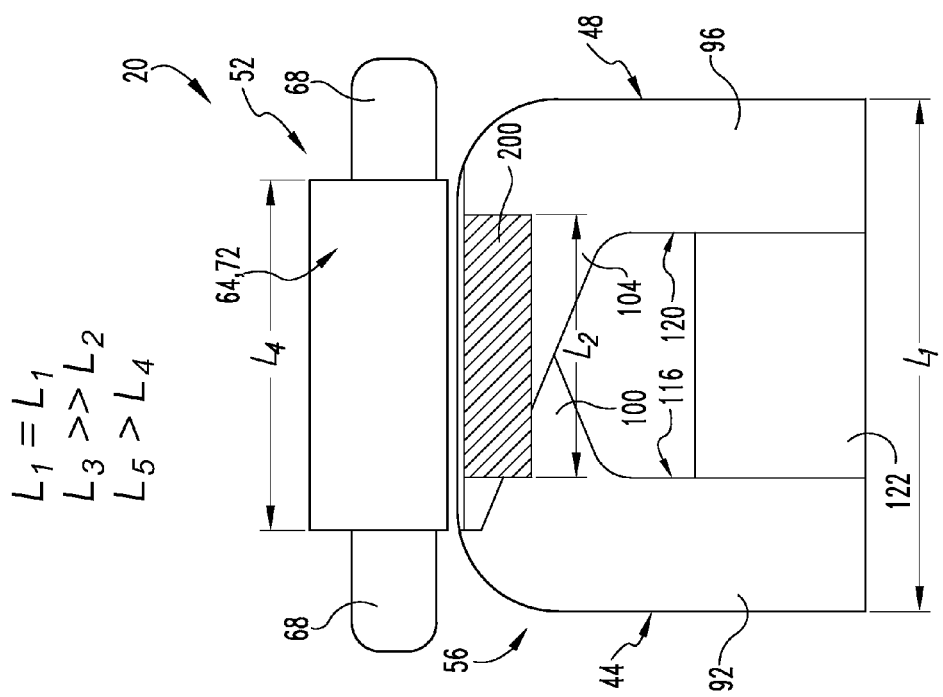

CLAW POLE ROTOR WITH CAVITY FOR MINIMIZING FLUX LEAKAGE

CROSS-REFERENCE TO RELATED APPLICATION(S)

This application claims the benefit under Title 35, U.S.C. §119(e) of U.S. Provisional Patent Application Ser. No. 61/808,991, entitled ROTARY ELECTRIC MACHINE ROTOR POLE CONFIGURATION, filed Apr. 5, 2013, the entire disclosure of which is expressly incorporated herein by reference.

BACKGROUND

The present disclosure relates to rotary electric machines, and particularly to rotors therefor, and more particularly to rotor types which include permanent magnets.

An example of a prior rotary electric machine to which the teachings of the present disclosure may be applied, an alternator for use in a vehicle, is depicted in FIG. 1. Alternator 20 has a housing 24 and a rotor shaft 28 supported within the housing 24 by front and rear rolling element bearings 32 and 36, respectively. A belt driven pulley 40 is fastened to a protruding front end of the rotor shaft 28. The rotor 56 of the depicted rotary electric machine 20 includes front and rear alternator pole pieces 44 and 48, respectively, which are mounted to and rotate with the shaft 28. Alternator 20 generally includes a stator 52 which surrounds the rotor 56 and is affixed to the housing 24. Rotation of the rotor 56 about its axis of rotation, the machine central axis 60, causes an alternating current to be induced in the stator winding 68.

The stator 52 generally includes a stator core 64 about which stator winding 68 is coiled. As is known in the art, the stator core 64 generally includes a lamina stack 72 formed by a plurality of laminae stacked axially relative to the rotational axis 60 of the rotor shaft 28. Each lamina may be made of electrical steel or another suitable ferromagnetic material. Referring to FIG. 2, the stator winding 68 typically includes a plurality of conductors 76, and the stator core 64 defines a plurality of slots 80 leaving a plurality of stator teeth 84 therebetween; the stator slots 80 and teeth 84 are also shown in FIG. 10. The plurality of conductors 76 extend axially through the slots 80 and are looped in a conventional fashion such that the loops are distributed around the circumference of the stator 52. As shown in FIG. 2, the plurality of stator winding conductors 76 are namely a first conductor 76a, a second conductor 76b, and a third conductor 76c, the conductors defining three phases of electrical power generated by the alternator.

The rotor 56 is a type well-known as a claw-pole rotor, and includes the pair of opposing claw-pole pieces 44, 48 and an excitation field coil 88 disposed about the central axis 60. Pole pieces 44 and 48 are made of a magnetic material such as steel, and are substantially identical to each other, having respective hub portions 92, 96 and a plurality of respective, elongate pole segments or fingers 100, 104. The pole fingers of each pole piece 44, 48 are distributed about the circumference of the respective hub portion 92, 96 and are spaced by voids 108 in the respective hub portion. The pole fingers 100, 104 of each pole piece 44, 48 extend axially away from their respective hub portion, and axially towards the hub portion 92, 96 of the other pole piece. Further, the pole fingers 100, 104 of each pole piece 44, 48 are symmetrically spaced around the perimeter of the respective hub portion 92, 96 and, with the rotor 56 configured as assembled onto the shaft 28, are interleaved in a non-contacting, spaced relationship with the pole fingers of the other pole piece, as shown in FIG. 2. Air gaps or channels are thus defined between adjacent pole fingers 100,104 and are distributed circumferentially about the rotor 56.

Referring to FIG. 3, the excitation field coil 88 of the rotor 56 is wound upon an electrically insulative bobbin 112 and the coil 88 and bobbin 112 are sandwiched between the pair of opposing, axially inwardly facing surfaces 116, 120 of the pole piece hub portions 92, 96. Pole pieces 44, 48 may have axially-extending portions 121 about which the field coil 88 and its bobbin 112 are disposed, as shown in FIG. 1, or the field coil 88 and its bobbin 112 may be disposed about a cylindrical rotor core member 122 disposed about the central axis 60 and located between the pole pieces 44, 48, as shown in FIG. 3. Referring again to FIG. 1, DC excitation current is applied to the excitation winding 88 through a pair of slip rings 124 and associated contact brushes 128. The slip rings 124 are secured to the shaft 28 and in operation couple the field coil 88 to a regulated DC current source via the contact brushes 128. A control system known as a voltage regulator (not shown) is used to apply an appropriate level of DC voltage to the excitation windings 88.

The pole pieces 44, 48 and the energized field winding 88 produce an alternating polarity magnetic field that rotates with the rotor 56 about the central axis 60. Although a DC excitation current is applied to the field winding 88, the interlacing of the alternating pole fingers 100, 104 creates an alternating polarity magnetic flux linkage. This magnetic flux linkage is presented to the winding conductors 76 of the stationary stator 52 that surrounds the rotor 56. The movement of the alternating polarity magnetic flux linkage presented by the rotor 56 across the stator winding conductors 76a, 76b, 76c generates three-phase AC electrical power in a well-known manner.

Typically, AC electrical output by the alternator 20 is directed to a rectifier 132, which may be located at the rear of the housing 24 as shown in FIG. 1. The alternator may also include further filtering and power conditioning devices through which the electrical output is directed before it is conducted as DC electrical power to the positive terminal of the vehicle battery (not shown) or an electric distribution bus (also not shown). The desired RMS value of the outputted alternating current from the alternator 20 is dependent upon the level of DC voltage applied by the voltage regulator to the excitation windings 88. Additionally, front and rear air circulation fans 136 and 140 are located at opposite axially outward sides of the pole pieces 44, 48. The fans 136, 140 are coupled to the rotor 56 and rotate in unison therewith. Cooling airflow is typically drawn axially inwardly of the housing 24, and is expelled radially outwardly of the housing 24, by the fans 136, 140. The rear fan 140 typically directs cooling airflow across the rectifier 132 and other electronic components of the alternator 20. If an airflow path is provided, the fans 136, 140 may also direct some amount of cooling airflow around the pole fingers 100, 104 and the excitation coil 88.

The direction of rotation of the rotor 56 relative to the stator 52, and thus the direction of movement of the rotor pole fingers 100, 104 relative to the stator teeth 84 is shown by arrow 144. Upon energization of the field coil 88 with a regulated DC current the rotor 56 is magnetized, with the adjacent pole fingers 100, 104 alternating circumferentially between north (N) and south (S) magnetic polarities. In other words, all pole fingers 100 have N magnetic polarity and all pole fingers 104 have S magnetic polarity. Accordingly, it will be recognized that upon rotation of the rotor 56, the alternating magnetic polarities of the pole fingers 100, 104 pass sequentially around the stator 52, thereby inducing an output current in the stator winding 68. Those of ordinary skill in the art will recognize that the respective N and S magnetic polarities of the front and rear pole pieces 44, 48 are determined as a function of the chosen direction of DC current flow through the excitation field coil 88.

FIGS. 5A-5H show an example of a prior claw-pole piece 44 or 48 including a plurality of pole fingers or segments 100, 104 each having a base or proximal end 148 connected to the respective pole piece hub portion 92, 96 at locations between the voids 108. Each pole finger 100, 104 also has a tip or distal end 152 opposite is respective base 148, and the tips 152 of the pole fingers 100, 104 of one pole piece 44, 48 are located near the base 148 of the pole fingers 100, 104 of the other pole piece 44, 48, as shown in FIG. 3.

Each pole finger 100, 104 also has a leading edge 156 and an opposite trailing edge 160, each of which extends between the base 148 and the tip 152 of the pole finger. The designation of an edge 156, 160 as leading or trailing is related to the direction of pole finger travel relative to the stator core teeth 84, as indicated by arrow 144. The leading and trailing edges 156, 160 of each pole finger 100 of front pole piece 44 respectively define leading edge side surface 164 and trailing edge side surface 168; the leading and trailing edges 156, 160 of each pole finger 104 of rear pole piece 48 respectively define leading edge side surface 172 and trailing edge side surface 176.

Each pole finger 100 also defines a radially outer surface 180 and a radially inner surface 184, each of which extends circumferentially between its opposite leading and trailing edge side surfaces 164, 168. Each pole finger 104 also defines a radially outer surface 188 and a radially inner surface 192, each of which extends circumferentially between its opposite leading and trailing edge side surfaces 172, 176. As shown in FIGS. 2 and 5A, each radially outer surface 180, 188 lies along a respective surface line 196 that is substantially parallel with central axis 60, such that a cylinder may be defined by the arranged plurality of surface lines 196. Thus, the radially outer surfaces 180, 188 of the plurality of alternating pole fingers 100, 104 define the substantially cylindrical outer circumferential surface of the rotor 56.

Relative to each pole finger 100, 104 shown in FIGS. 1-8 and 10, which depict them as having a generally pyramidal shape, the respective radially inner surface 184, 192 is closer to the central axis 60 near its base or proximal end 148, and further from the central axis 60 near its tip or distal end 152, which may be flattened, as shown. Thus, each pyramidal pole finger 100, 104 is thicker radially, relative to the axis 60, between its radially outer surface 180, 188 and its radially inner surface 184, 192, at its proximal end or base 148 than at its distal end or tip 152. Additionally, when viewed in a radial direction each pyramidal pole finger 100, 104 is tapered as the pole finger extends away from its respective hub portion 92, 96 and therefore is circumferentially wider between its leading and trailing edges 156, 160 at its proximal end 148 and narrower at its distal end 152. It can therefore be understood that each pole finger 100, 104 may be generally V-shaped as viewed in both a radial direction relative to the central axis 60, and in a direction normal to an imaginary plane in which the respective surface line 196 and the central axis 60 both lie. In other words, each generally pyramidal pole finger 100, 104, if sectioned at its base 148 by an imaginary plane oriented perpendicular to the central axis 60 and flattened at its tip, is substantially hexahedral.

Moreover, as can be clearly understood from the various views of FIGS. 1-8, in imaginary planes perpendicular to the central axis 60, at varying distances axially along each pyramidal pole finger 100, 104 (that is, at various axial locations in directions generally parallel with the central axis 60, the respective thickness of each pole finger between its radially outer surface 180, 188 and its radially inner surface 184, 192 is substantially uniform between its leading and tailing edges 156, 160. Additionally, but for radially inner and outer surfaces 180, 188, 184, and 192 presenting slight curvatures about the central axis 60 corresponding to the cylindrical shape of the rotor 56 (convex in the case of radially outer surface 180, 188, and concave in the case of radially inner surface 184, 192), these surfaces 180, 188, 184, and 192 are generally flat and featureless between their respective pole finger leading and trailing edges 156, 160.

In some prior machines 20 the pole fingers 100, 104, rather than being generally pyramidal in shape as discussed above, instead have a different geometry. For example, referring to FIG. 9, the pole pieces 44, 48 may instead define pole fingers or segments 100, 104 that are generally rectangular in shape when viewed radially relative to the central axis 60. As in the case of the generally pyramidal pole segments described above, the pole fingers or segments 100, 104 of the prior claw-pole pieces 44 or 48 shown in FIG. 9 each have: a base or proximal end 148 connected to the respective pole piece hub portion 92, 96 at locations between the voids 108; a tip or distal end 152 opposite its respective base 148, with the tip 152 of the pole finger of one pole piece 44, 48 being located near the base 148 of the pole finger of the other pole piece 44, 48; a leading edge 156; and an opposite trailing edge 160, the leading and trailing edges 156, 160 extending between the pole finger base 148 and tip 152. The generally parallel leading and trailing edges 156, 160 of each pole finger 100 respectively define the leading edge side surface 164 and the trailing edge side surface 168, whereas the leading and trailing edges 156, 160 of each pole finger 104 respectively define the leading edge side surface 172 and trailing edge side surface 176. As discussed above, the designation of an edge 156, 160 as leading or trailing is related to the direction of pole finger travel relative to the stator core teeth 84, as indicated by arrow 144.

Unlike the generally pyramidal pole segments described above, however, in the example of FIG. 9 the leading and trailing edges 156, 160 are generally parallel to each other and to the central axis 60. Here, the depicted pole finger tips or distal ends 152 are flat, and each pole finger 100, 104, if sectioned at its base 148 by an imaginary plane oriented perpendicular to the central axis 60, may be substantially hexahedral. In the example depicted in FIG. 9, each pole finger 100, 104 respectively defines a radially outer surface 180, 188 and a radially inner surface 184, 192 (not shown in FIG. 9). As in the case of the generally pyramidal pole fingers, each radially outer, rectangular surface 180, 188 lies along a respective surface line 196 that is substantially parallel with the central axis 60, whereby the cylindrical rotor shape may be defined by the arranged plurality of surface lines 196. Relative to each pole finger 100, 104, its respective radially outer surface 180, 188 extends a substantially uniform distance between the circumferentially opposite leading edge 156 and trailing edge 160; similarly, its respective radially inner surface 184, 192 extends a substantially uniform distance between the circumferentially opposite leading edge 156 and trailing edge 160. Thus, each pole finger 100, 104 has a generally rectangular shape when viewed in a radial direction, as mentioned above.

Furthermore the pole fingers 100, 104 depicted in FIG. 9 may each be substantially configured as a rectangular parallelepiped or cuboid, wherein, as viewed in a direction normal to an imaginary plane in which the respective surface line 196 and the central axis 60 both lie, the thickness of each pole finger 100, 104 between its respective radially outer surface 180, 188 and radially inner surface 184, 192, is substantially uniform along its axial direction, i.e., in a direction generally parallel with the surface line 196. Thus, each pole finger 100, 104 has a generally rectangular shape when viewed in a tangential direction, perpendicular to the central axis 60. Furthermore, but for surfaces 180, 188, 184, 192 presenting slight curvatures about the central axis 60 corresponding to the cylindrical shape of the rotor 56 (convex in the case of radially outer surface 180, 188, and concave in the case of radially inner surface 184, 192), the surfaces 180, 188, 184, and 192 of the generally cuboid pole fingers 100, 104 are generally flat between their respective pole finger leading and trailing edges 156, 160. Moreover, the opposed radially outer surface 180, 188 and radially inner surface 184, 192 of each generally cuboid pole finger 100, 104 are substantially parallel. In other words, in imaginary planes perpendicular to the central axis 60, at varying distances axially along each pyramidal pole finger 100, 104 (that is, at distances in directions generally parallel with surface lines 196), the respective thickness of each pole finger between its radially outer surface 180, 188 and radially inner surface 184, 192 is substantially uniform. A prior electrical machine including pole fingers or pole segments having leading and trailing edges substantially parallel with each other and the machine central axis is also disclosed in U.S. Pat. No. 7,973,444 entitled ELECTRIC MACHINE AND ROTOR FOR THE SAME and assigned to the assignee of the present application, the entire disclosure of which is expressly incorporated herein by reference.

As noted above, regardless of whether their pole fingers 100, 104 are generally pyramidal or generally cuboid, in prior rotary electrical machines such as an alternator 20 the pole finger radially inner surfaces 184, 192 are substantially flat or provided with only a very minor concave curvature about the central axis 60 between their respective leading and trailing edges 156, 160, at various locations along the axial length of the pole finger, i.e., in directions parallel with surface lines 196. The curvature of the radially inner surface 184, 192, where present, is more pronounced near the pole finger base or proximal end 148 than it is near the pole finger tip or distal end 152, as revealed by comparisons between FIGS. 5F-5H, and between FIGS. 7B-7E.

It is also known to employ permanent magnets in the rotors of rotary electrical machines such as alternators. In some prior alternators, high-magnetic-strength permanent magnets 200 are disposed between the adjacent claw-pole fingers 100, 104 to supplement the magnetic field generated by the excitation coil 88. Such magnets 200, which are optional, are shown in FIGS. 6-9. Any of a variety of permanent magnet material may be used for permanent magnets 200 such as neodymium-iron-boron, samarium-cobalt, or ferrite. Alternators utilizing both field coil and permanent magnet fluxes coupled to a stator coil are referred to as hybrid alternators. Referring to FIG. 10, in a hybrid alternator 20, permanent magnets 200 maintain a permanent magnet flux across channels 204 that would otherwise be air gaps between the claw-pole segments 100, 104, which in a hybrid alternator are magnetically linked to the permanent magnets 200 disposed in channels 204 and carried by the rotor 56, and a portion of the stator structure 52, thereby coupling significant magnetic flux through the stator structure. The magnetic flux path 208 is shown in dashed lines in FIG. 10. When the field coil 88 is not energized, the magnetic flux developed by the permanent magnets 200 is shunted through the rotor 56. However, when the field coil 88 is energized, the magnetic flux developed by the permanent magnets 200 additively contributes to the electromagnetically generated magnetic flux resulting from field coil excitation, across the stator/rotor air gap 212. Depending on the desired output of the hybrid alternator 20, the effect of the permanent magnets 200 on the flux across the radial stator/rotor air gap 212 may supplement, or boost, the electromagnetic flux generated by the DC current being passed in one direction through the field effect coil 88; the effect of the permanent magnets on the flux across the stator/rotor air gap may also be reduced, or bucked, by electromagnetic flux that is generated by DC current being passed in the opposite direction through the field effect coil 88. Alternator buck/boost control circuits are known in the art and may be of various designs, one of which is disclosed in above-mentioned U.S. Pat. No. 7,973,444.

Channels 204 may be oriented as described above; typically, the orientation and shape of the permanent magnets 200 is similar. Thus, permanent magnets 200 are generally prism-shaped with six substantially flat faces. The permanent magnets 200 being substantially prism-shaped provides substantially symmetrical abutting surfaces at their respective interfaces with the leading and trailing edge side surfaces 164, 168, 172, 176. The prism-shaped permanent magnets 200 are illustrated herein as an exemplary shape, it being understood that other shapes for the permanent magnets will be apparent to the skilled artisan. As shown herein, each permanent magnet 200 has a pair of circumferentially opposing pole faces 216, with the polarized faces 216N and 216S corresponding to N and S magnetic polarities, respectively. The polarities of the permanent magnets alternate such that adjacent magnets are of opposite polarity. Therefore, it can be appreciated that claw-pole fingers 100 abut permanent magnet pole faces 216N and have a first common polarity (i.e., N), and claw-pole fingers 104 abut permanent magnet pole faces 216S and have a second common polarity (i.e., S). The pole faces 216N, 216S of magnets 200 are immediately adjacent respective leading and trailing edge side surfaces 164, 168, 172, 176 on pole fingers 100 and 104. As mentioned above, all pole fingers 100 have N magnetic polarity and all pole fingers 104 have S magnetic polarity. All permanent magnet pole faces 216N are adjacent the side surfaces 164, 168 of each N pole finger 100. Likewise, all permanent magnet pole faces 216S are adjacent the side surfaces 172, 176 of each S pole finger 104. The foregoing arrangement is generally well known to those skilled in the art.

Typically, when permanent magnets 200 are added between the claw poles 100, 104 of an alternator 20 to boost machine performance, the air gap channel 204 is machined or otherwise adapted to provide a constant width between the opposing pole finger leading and trailing edge side surfaces 164, 168, 172, 176 to contain the magnets. However, the shape of the claw-pole pieces 44, 48 used in prior hybrid alternators is not optimized to maximize the use of the permanent magnets 200. Rather, the pole piece designs of such hybrid machines, and particularly the designs of their pole segments or fingers 100, 104 are "carried over" from a conventional, non-permanent magnet-equipped claw-pole rotor design, which had already evolved to maximize machine performance without the addition of permanent magnets to the claw-pole rotor. To simply adhere to this practice does not take full advantage of the benefit of adding magnets to claw-pole rotors.

A rotary electric machine configured to maximize the beneficial aspects of a permanent magnet-equipped rotor would provide a desirable improvement in the art.

SUMMARY

The present disclosure is aimed at providing such a rotary electric machine and rotor. The present disclosure teaches a pole piece configuration that maximizes the performance of its claw-pole segments when used with permanent magnets by modifying the pole geometry. The shape of the radially inner underside surface of the pole finger near the area of the tip is configured to be significantly concave, which minimizes the flux leakage from the tip or distal end of a first pole finger or segment, to the base or proximal end of a circumferentially adjacent second pole finger or segment, where the first pole segment tip overlaps the second pole segment base. Yet, the first pole finger or segment may also have its full radial thickness or depth along the sides of the permanent magnet disposed between the first and second pole fingers, which facilitates full utilization of the magnet's flux production.

The sides of the pole finger against which the permanent magnets rest are essentially flat and of constant radial depth or thickness for the full axial length of the pole finger. Although the exemplary embodiment of the improved pole finger geometry is shown as having a generally cuboid envelope having a generally square axial cross section, it is to be understood that the teachings of the present disclosure apply equally well to a conventional, generally pyramidal alternator claw-pole segment or finger. The teachings of the present disclosure also apply equally well to brushed or brushless alternators.

The benefit of this geometry is that, for a given magnetically active axial length of the rotor, it allows the magnetic utilization of a much longer permanent magnet in the rotor. This greatly increases electrical machine performance by generating much higher levels of flux linkage between the stator and the rotor for a given rotor axial stack length and/or a given stator axial stack length, vis-à-vis prior alternators. Second, by virtue of the concave radially inner surface shape of the pole finger, a natural air passage is formed that allows axial air flow through the rotor assembly for improved cooling.

The pole finger geometry according to the present disclosure was arrived at through the use of three dimensional Finite Element Analysis (3D FEA) magnetic modeling and a lengthy design process. Measured performance with actual alternator prototypes yielded output current levels twice that of conventional claw-pole alternators of comparable size, which represents a significant improvement over the prior art.

The present disclosure provides a rotor for a rotary electric machine, the rotor including a first pole piece and a second pole piece each having a respective magnetic hub arranged for rotation about an axis, the first and second pole piece hubs spaced along the axis. The rotor also includes a plurality of magnetic first pole fingers and a plurality of magnetic second pole fingers spaced from each other and extending between the first and second pole piece hubs. Each pole finger has a proximal end and an axially opposite distal end, the first and second pole finger proximal ends connected to the respective one of the first and second pole piece hubs. The first and second pole fingers circumferentially alternate about the axis, and each pole finger has a respective radially inner surface defining a cavity that extends axially from the distal end to a cavity terminus. Relative to each pole finger, at a respective axial position between the distal end and the cavity terminus the radial distance between the axis and the radially inner surface is substantially greater inside of the cavity than outside of the cavity.

A further aspect of the rotor is that relative to each pole finger, the cavity terminus is located between the proximal end and the distal end.

A further aspect of the rotor is that relative to each pole finger, the radial distance between the axis and the radially inner surface inside of the cavity is greater at a first axial location which is between the distal end and the cavity terminus than at a second axial location which is between the first axial location and the cavity terminus.

A further aspect of the rotor is that each pole finger has circumferentially opposite leading and trailing edges, and the respective cavity is located between the leading and trailing edges.

A further aspect of the rotor is that relative to each pole finger, the cavity has a width that varies in a direction perpendicular to the axis, the width being greater at a first axial location which is between the distal end and the cavity terminus than the width at a second axial location which is between the first axial location and the cavity terminus.

A further aspect of the rotor is that relative to each pole finger, the cavity has a generally triangular shape in an imaginary plane perpendicular to the axis.

A further aspect of the rotor is that relative to each pole finger, the cavity has a generally triangular shape in an imaginary plane parallel to the axis.

A further aspect of the rotor is that the cavity terminus of each pole finger defines a cavity apex.

A further aspect of the rotor is that relative to each pole finger, at the respective cavity terminus and distal end, the radially inner surface at locations outside of the cavity are radially equidistant from the axis.

A further aspect of the rotor is that each pole finger defines a radially outer surface, and the respective pole finger has a radial thickness between the radially inner surface and the radially outer surface. The radial thickness at a first location outside of the cavity is greater than the radial thickness at a second location inside of the cavity.

An additional aspect of the rotor is that each pole finger has circumferentially opposite leading and trailing edges, and the first location is circumferentially between the cavity and one of the leading and trailing edges of the respective pole finger.

An additional aspect of the rotor is that the first location is between the proximal end and the cavity terminus of the respective pole finger.

A further aspect of the rotor is that each pole finger has circumferentially opposite leading and trailing edges. The respective radially inner surface extends circumferentially between the leading and trailing edges, and the leading and trailing edges are substantially parallel with the axis.

A further aspect of the rotor is that, magnetically, the first pole fingers are N pole fingers and the second pole fingers are S pole fingers. The rotor also includes at least one magnet disposed between a circumferentially adjacent pair of N and S pole fingers. The magnet has opposite N and S pole faces, with the magnet N pole face interfacing the N pole finger, and the magnet S pole face interfacing the S pole finger.

A further aspect of the rotor is that each pole finger has circumferentially opposite leading and trailing edge side surfaces and the respective radially inner surface extends circumferentially between the leading and trailing edge side surfaces. The rotor also includes at least one magnet disposed between the interfacing leading and trailing edge side surfaces of a pair of circumferentially adjacent first and second pole fingers, and having magnetically opposite pole side surfaces. Each magnetically opposite pole side surface of the magnet(s) abut one of the pole finger leading and trailing edge side surfaces substantially along the entire length of the respective pole finger between the pole finger's proximal and distal ends.

A further aspect of the rotor is that it also includes an excitation coil disposed about the axis and located between the first and second pole piece hubs. The N and S magnetic polarity designations of the first and second pole piece hubs are selectively determined by a chosen electric current flow direction through the excitation coil.

The present disclosure also provides a rotary electric machine including a rotor as described above, a stator surrounding the rotor, and a housing connected to the stator. The rotor is supported by the housing for rotation relative to the stator.

The present disclosure also provides a rotor for a rotary electric machine, the rotor including a pair of magnetic, first and second pole pieces each having a respective hub. The first and second pole piece are hubs spaced along an axis and have first and second pluralities of pole fingers, respectively. Each of the first and second pluralities of pole fingers are spaced from the other and distributed about the axis to define a substantially cylindrical outer rotor surface. Each pole finger has a base attached to its respective first or second pole piece hub and extends towards the other pole piece hub. Each pole finger of one of the first and second pluralities of pole fingers terminates at a tip positioned proximate the bases of a pair of pole fingers included in the other of the first and second pluralities of pole fingers. Each pole finger tip is provided with a radially inwardly open cavity. The cavity has a length that extends in an axially inward direction from the tip towards the base of the respective pole finger to a cavity terminus. The cavity has a width dimension extending between opposite edges of the respective pole finger in a direction generally perpendicular to the axis, and a depth dimension extending generally radially into the respective pole finger. At least one of the cavity width and depth dimensions diminishes along the cavity length in the axially inward direction.

A further aspect of the rotor is that, magnetically, the first pole fingers are N pole fingers and the second pole fingers are S pole fingers. The rotor also includes at least one magnet disposed between a circumferentially adjacent pair of N and S pole fingers, the magnet having opposite N and S pole faces. The magnet N pole face(s) interface the N pole finger, and the magnet S pole face(s) interface the S pole finger.

The present disclosure also provides a rotary electric machine including a rotor as described above, a stator surrounding the rotor, and a housing connected to the stator. The rotor is supported by the housing for rotation relative to the stator.

BRIEF DESCRIPTION OF THE DRAWINGS

The various objects, features and attendant advantages of the present invention will become fully appreciated as the same becomes better understood when considered in conjunction with the accompanying drawings. It is to be noted that the accompanying drawings are not necessarily drawn to scale or to the same scale; in particular, the scale of some of the elements of the drawings may be exaggerated to emphasize characteristics of the elements. Moreover, like reference characters designate the same, similar or corresponding parts throughout the several views, wherein:

FIG. 3 is a sectional side view of a prior alternator rotor along line 3-3 of FIG. 4;

FIG. 4 is a fragmented front view of the prior alternator rotor;

FIG. 5A is perspective view of a prior pole piece having pole fingers that are generally pyramidal in shape;

FIG. 5B is an axial end view of the pole piece of FIG. 5A;

FIG. 5C is an opposite axial end view of the pole piece of FIG. 5B;

FIG. 5D is a side view of the pole piece of FIG. 5C;

FIG. 5E is a sectional view of the pole piece of FIG. 5C along line 5E-5E;

FIG. 5F is a sectional view of a pole finger of the pole piece of FIG. 5D along line 5F-5F;

FIG. 5G is a sectional view of a pole finger of the pole piece of FIG. 5D along line 5G-5G;

FIG. 5H is a sectional view of a pole finger of the pole piece of FIG. 5D along line 5H-5H;

FIG. 6 is a partial, fragmented, exploded view of a prior rotor having generally pyramidal pole fingers and optional permanent magnets;

FIG. 7A is a sectional side view of a prior alternator rotor having permanent magnets along line 7A-7A of FIG. 8;

FIG. 7B is an axial end view of the rotor of FIG. 7A along line 7B-7B, showing the pole finger tip;

FIG. 7C is a sectional view of the rotor of FIG. 7A along line 7C-7C, showing an axial cross section of the pole finger;

FIG. 7D is a sectional view of the rotor of FIG. 7A along line 7D-7D, showing an axial cross section of the pole finger and permanent magnets;

FIG. 7E is a sectional view of the rotor of FIG. 7A along line 7E-7E, showing an axial cross section of the pole finger and permanent magnets;

FIG. 8 is a fragmented front view of a prior alternator rotor having permanent magnets;

FIG. 9 is a partial, fragmented, exploded view of a prior rotor having generally cuboid pole fingers and optional permanent magnets;

FIG. 12 is a sectional side view of an alternator rotor according to the present disclosure along line 12-12 of FIG. 13;

FIG. 13 is a fragmented front view of an alternator rotor according to the present disclosure;

FIG. 14A is a sectional side view of an alternator according to the present disclosure along line 14A-14A of FIG. 15;

FIG. 14B is a fragmented, partial sectional view of the rotor of FIG. 14A along line 14B-14B, showing an axial end view of a pole finger and permanent magnets;

FIG. 14C is a fragmented, sectional view of the rotor of FIG. 14A along line 14C-14C, showing an axial cross section of the pole finger and magnets;

FIG. 14D is a fragmented, sectional view of the rotor of FIG. 14A along line 14D-14D, showing an axial cross section of the pole finger and magnets;

FIG. 15 is a fragmented front view of an alternator rotor according to the present disclosure;

FIG. 16 is an enlarged, fragmented view of an embodiment of a pole finger tip and permanent magnets according to the present disclosure;

FIG. 17 is a sectional side view of an alternator rotor and stator according to the prior art, for comparison with FIG. 18;

FIG. 18 is a sectional side view of an alternator rotor and stator according to the present disclosure, for comparison with FIG. 17.

Figure 1:
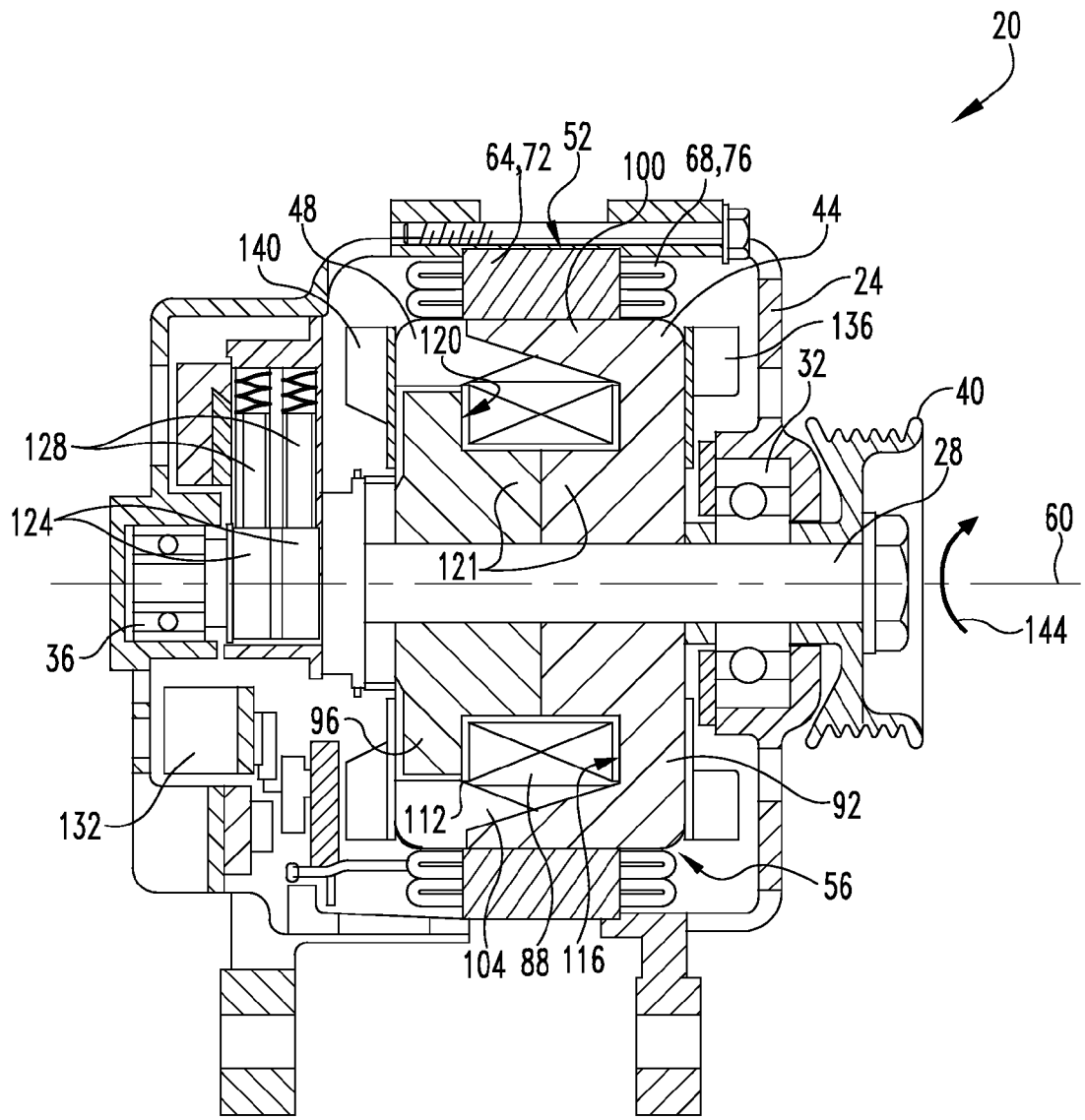
FIG. 1 is a sectional side view of a prior alternator assembly to which the teachings of the present disclosure may be adapted.
Figure 2:
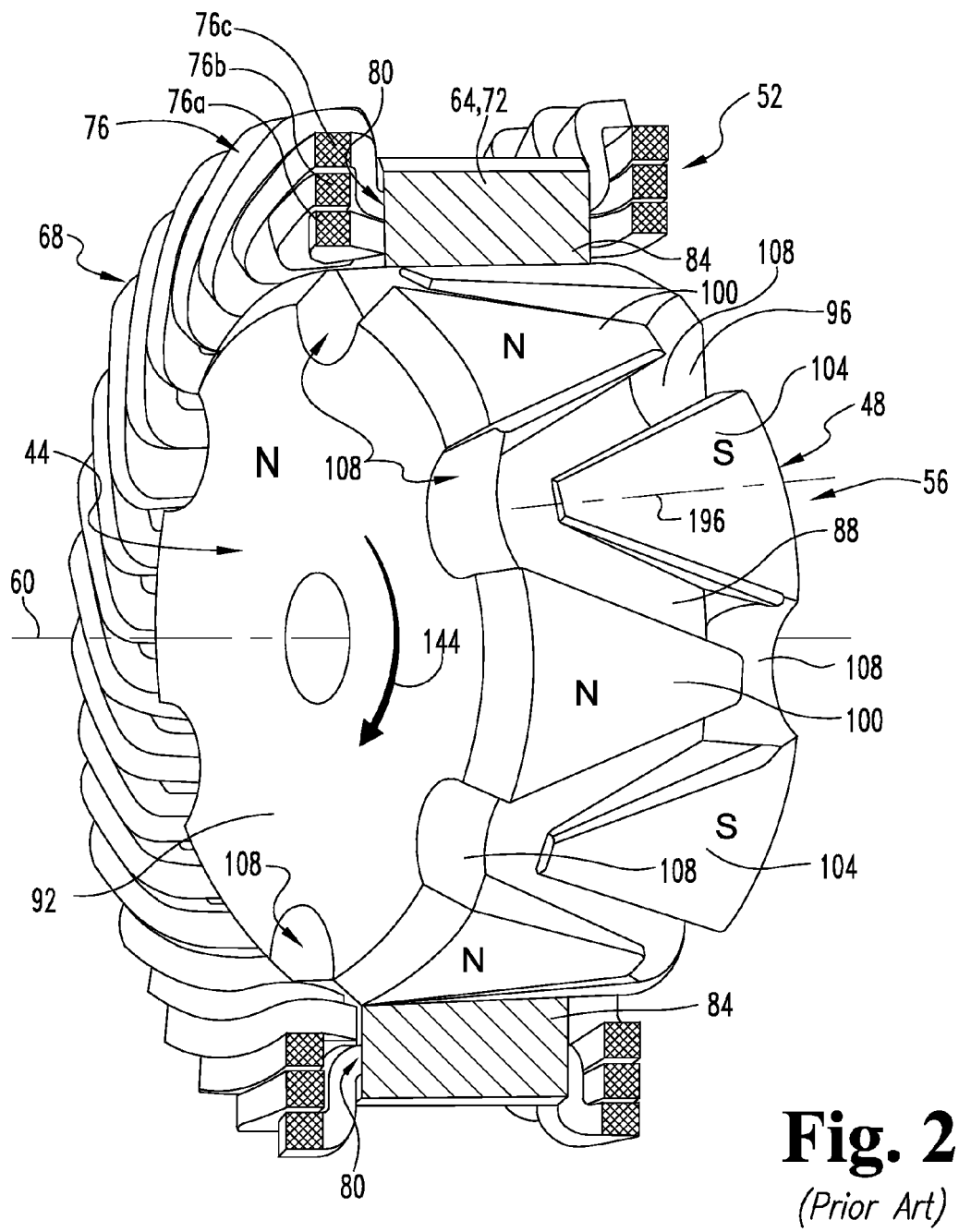
FIG. 2 is a partially sectioned front perspective view of a prior alternator stator and rotor to which the teachings of the present disclosure may be adapted.
Figure 10:
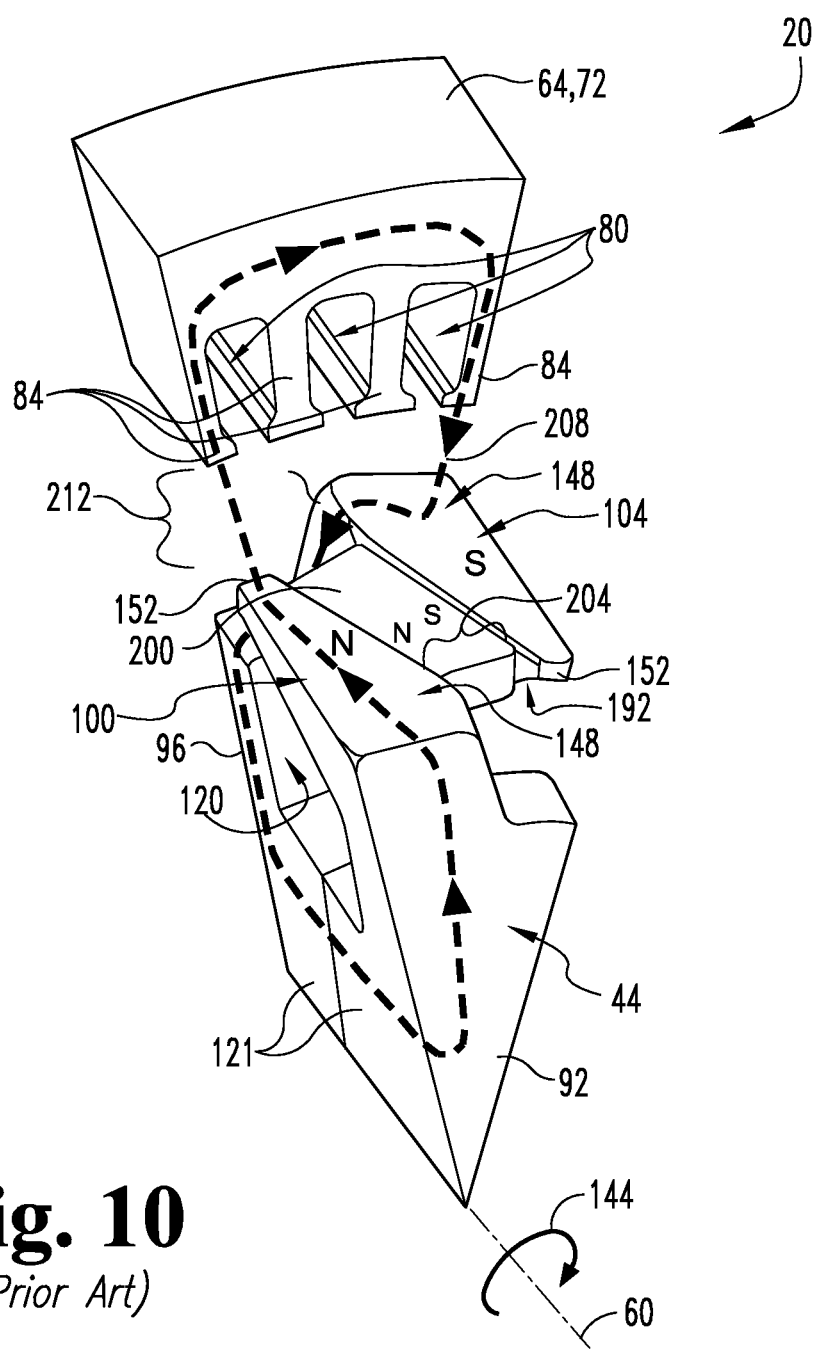
FIG. 10 is an enlarged partial sectional view of a prior rotor having permanent magnets and a stator core (with their excitation field coil and stator windings removed), showing the magnetic flux path therebetween.

Corresponding reference characters indicated corresponding parts throughout the several views. Although the drawings represent embodiments of the disclosed apparatus, the drawings are not necessarily to scale or to the same scale and certain features may be exaggerated in order to better illustrate and explain the present disclosure. Moreover, in accompanying drawings that show sectional views, cross-hatching of various sectional elements may have been omitted for clarity. It is to be understood that this omission of cross-hatching is for the purpose of clarity in illustration only.

DETAILED DESCRIPTION

The invention is susceptible to various modifications and alternative forms, and the specific embodiment thereof shown by way of example in the drawings is herein described in detail. The exemplary embodiment of the present disclosure is chosen and described so that others skilled in the art may appreciate and understand the principles and practices of the present disclosure. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

In referring below and in the drawings to a rotary electric machine or rotor according to the present disclosure, its structural elements corresponding to structural elements of the prior art discussed above are identified with a like reference numeral primed. Thus, for example, an embodiment of above-discussed rotary electric machine 20 and rotor 56 modified in accordance with the present disclosure is identified as rotary electric machine 20' and rotor 56'. Corresponding structural elements of machine 20' that are substantially unchanged relative to the prior art discussed above are identified with common respective element numerals. The magnetic flux path, though different between machines 20 and 20', is nonstructural and is commonly referred to with reference numeral 208.

Figure 11:
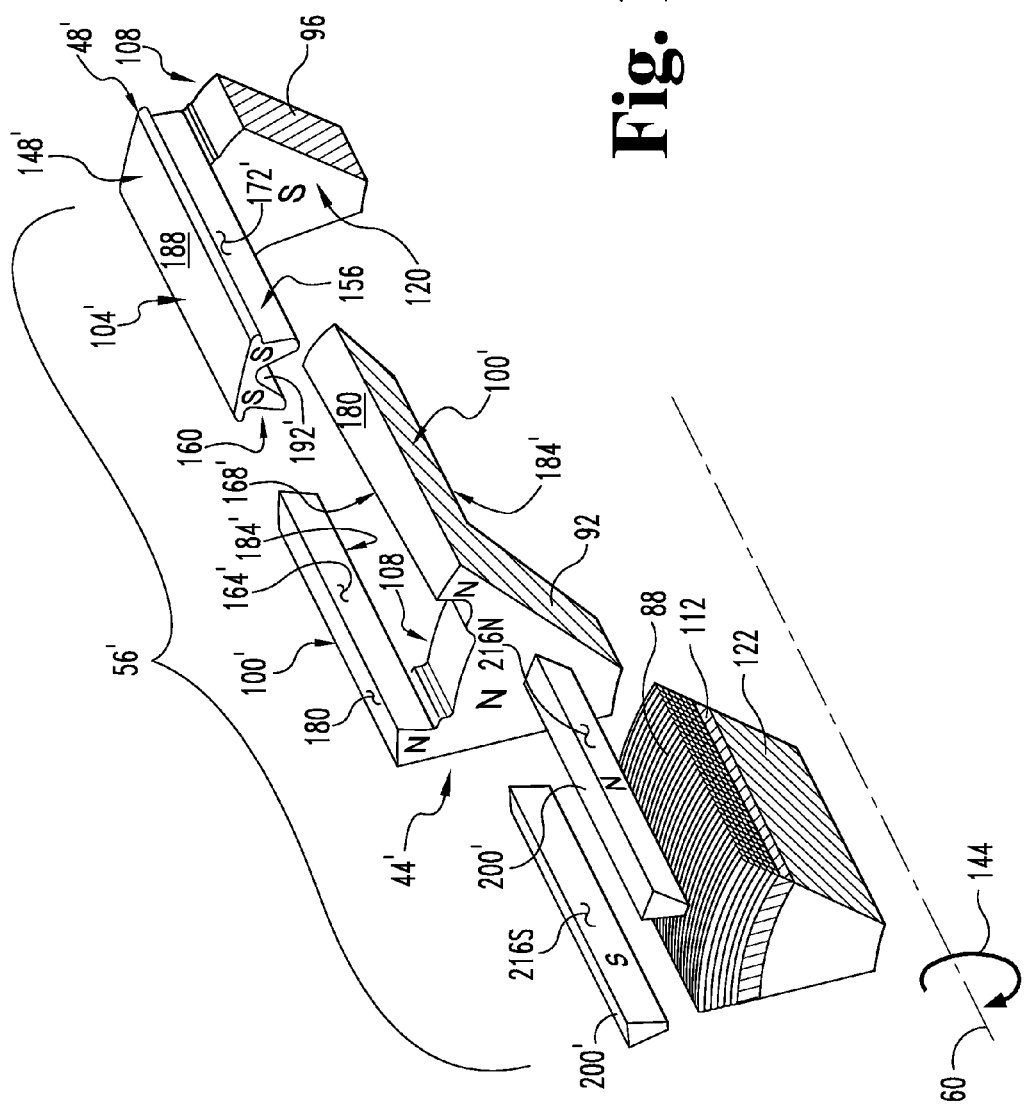
FIG. 11 is a partial, sectional, exploded view of an embodiment of a rotor according to the present disclosure.

FIG. 11 shows a rotor 56' according to the present disclosure. The depicted embodiment of rotor 56' is, but for the configuration of its pole fingers 100', 104' and possibly the axial length of its permanent magnets 200', substantially similar to prior rotor 56 having generally cuboid pole fingers 100, 104 and prism-shaped magnets 200.

As noted above, in prior rotary electric machines 20, regardless of whether their pole fingers 100, 104 are generally pyramidal or generally cuboid, the pole finger radially inner surfaces 184, 192 are substantially flat or provided with only a very minor concave curvature about the central axis 60 between their respective leading and trailing edges 156, 160. This surface curvature, where present, is more pronounced near the pole finger base or proximal end 148 than it is near the pole finger tip or distal end 152, as revealed by comparisons between FIGS. 5F-5H, and between FIGS. 7B-7E. This characteristic of the pole finger radially inner surfaces 184, 192 remains common between rotors 56 that employ permanent magnets 200, and those that do not. As explained above, it appears that while the configurations of the prior pole fingers 100, 104 may have been optimized to some degree for use in rotors 56 that do not include permanent magnets 200, the pole finger configurations remain essentially unchanged when the magnets are incorporated into those rotors. In other words, although the addition of the magnets 200 in prior rotors 56 may boost the performance of the machine 20 (which may, for example, be a hybrid alternator), the pole segments or fingers 100, 104 of these prior machines, between which the incorporated permanent magnets 200 are disposed, remain essentially unchanged.

The present disclosure provides pole pieces 44', 48' having modified pole finger configurations that, when used with permanent magnets 200', maximize the performance of the rotor 56' and its machine 20'. As best seen in FIGS. 12-16, rotor 56' of machine 20' includes substantially identical pole pieces 44', 48'. The respective pole segments or fingers 100', 104' of pole pieces 44', 48' are substantially different in shape than pole fingers 100, 104 of prior pole pieces 44, 48. Particularly, the configurations of the radially inner surfaces 184', 192' of the pole fingers 100', 104' differ significantly from those of the counterpart radially inner surfaces 184, 192 of prior pole fingers 100, 104. A comparison of FIGS. 14B-14D and FIGS. 5F-5H and/or FIGS. 7B-7E best illustrates this difference, despite the depicted pole fingers 100', 104' according to the present disclosure being of a generally cuboid type, and depicted pole fingers 100, 104 according to the prior art being of a generally pyramidal type. It is to be understood that the teachings of the present disclosure apply to pole fingers 100', 104' of types other than those depicted, such as pole fingers that are generally pyramidal. The comparison reveals that, in accordance with the present disclosure, the respective radially inner surface 184', 192' of each pole finger 100', 104', near the region of the pole finger tip or distal end 152', is configured to be significantly concave, which minimizes the flux leakage from the tip or distal end 152' of a first pole finger or segment 100' or 104', to the base or proximal end 148' of a circumferentially adjacent second pole finger or segment 100', 104', in the region of the rotor 56' where the first pole segment tip 152' overlaps the second pole segment base 148'. The radially inner surfaces 184, 192 of prior pole fingers 100, 104 are substantially flat surfaces, with any minor concavity that may be present being insignificant and merely corresponding to the diameter of the rotor 56. Comparatively, any concavity defined by the radially inwardly open cavity 220 provided in radially inner surfaces 184', 192' is significantly greater. As shown, the cavity 220 is defined by a generally triangular pyramidal void formed in the distal end 152' of the pole finger 100', 104'; the base of that triangular void may be understood to be located at pole finger tip 152', and its apex, the terminus of the cavity 220, may be understood to be located at a location 224 axially between the pole finger proximal and distal ends 148', 152', as best seen in FIGS. 12, 14A, and 16.

Moreover, each pole finger or segment 100', 104' may also have its full radial thickness or depth between radially outer surface 180, 188 and radially inner surface 184', 192' along the leading and trailing edges 156, 160, whereby the entirety of each respective circumferential face 216 of magnets 200' may abut a corresponding leading or trailing edge surface 164', 168', 172', 176'. The ability to mutually interface the entirety of each magnet polar face 216N, 216S and its respective, cooperating pole finger leading or trailing edge surface 164', 168', 172', 176' facilitates full utilization of the magnet's flux production. Notably, the leading or trailing edge surfaces 164', 168', 172', 176' are essentially flat and of constant radial depth or thickness for the full axial length of the pole finger 100', 104', that is, its full length in a direction generally parallel with surface line 196. Although the exemplary embodiment of the improved pole finger geometry is shown as having a generally cuboid envelope having a generally square axial cross section, it is to be understood that the teachings of the present disclosure apply equally well to a conventional, generally pyramidal alternator claw-pole segment or finger. The teachings of the present disclosure also apply equally well to brushed or brushless alternators.

Referring now to FIGS. 17 and 18, a benefit of the pole finger geometry in machine 20' vis-à-vis a prior machine 20 is that, for a given magnetically active axial length (L1=L1) of the rotor 56, 56', it allows the magnetic utilization of a much longer permanent magnet 200' (L3>>L2) in the rotor 56', which usefully allows a greater stator lamina stack axial length (L5>L4). This greatly increases the performance of electrical machine 20' vis-à-vis machine 20 by generating in machine 20' much higher levels of flux linkage between the stator 52' and the rotor 56' for a given rotor axial stack length (L1=L1) and/or a given stator laminae stack axial length (L4=L5).

A second benefit afforded by the pole finger geometry in machine 20' vis-à-vis machine 20 is that, by virtue of the cavity 220 in the radially inner surface 184', 192' of the pole finger 100', 104', a natural air passage is formed that allows relatively greater axial air flow through the rotor assembly 56' for comparatively improved cooling.

Figure 19:
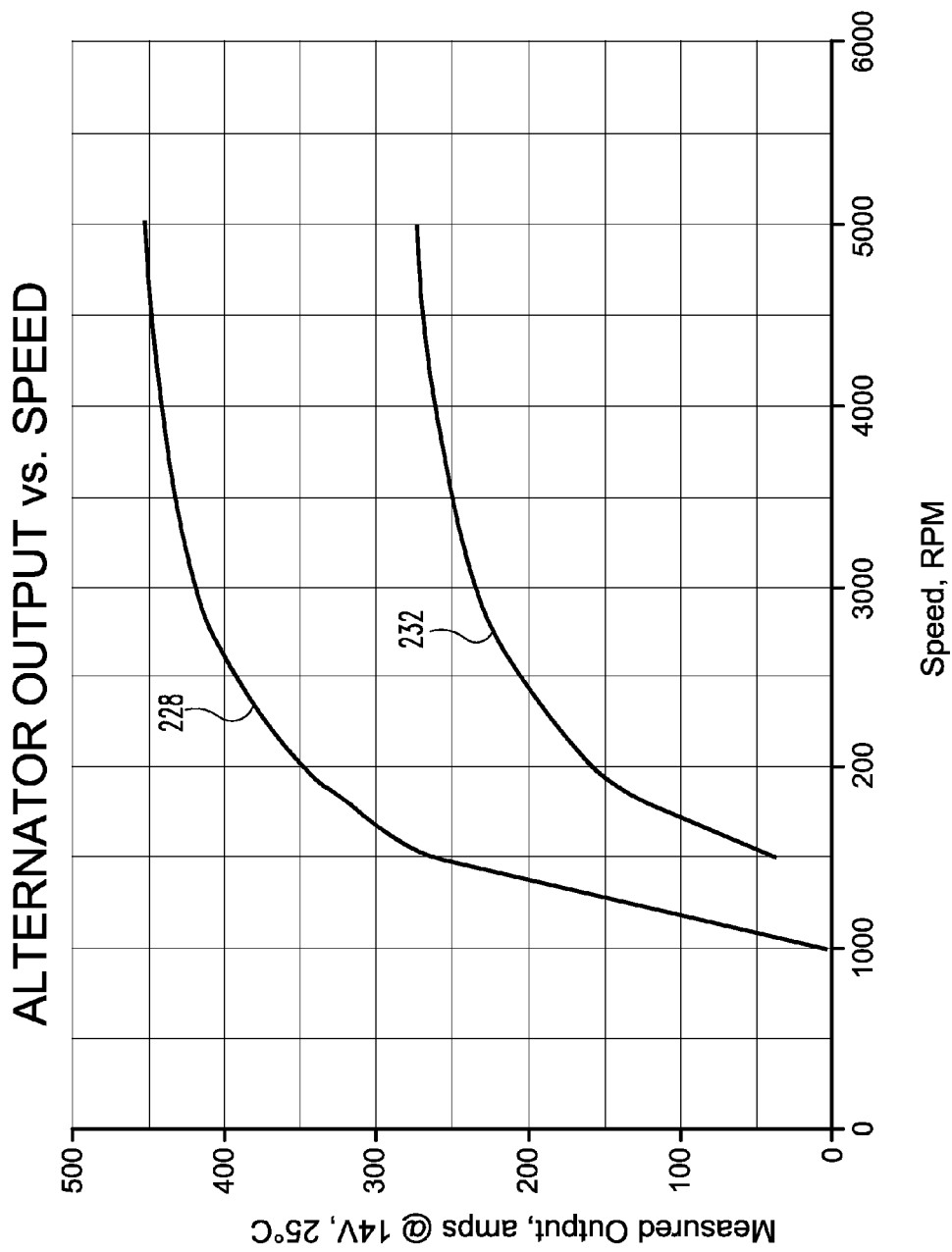
FIG. 19 is a graph illustrating the performance improvement of a hybrid alternator according to the present disclosure over a non-hybrid alternator according to the prior art.

As noted above, the pole finger geometry according to the present disclosure was arrived at through the use of three dimensional Finite Element Analysis (3D FEA) magnetic modeling and a lengthy design process, and actual alternator prototypes according to the present disclosure (i.e., prototype machines 20') have yielded measured output current levels with that are 200% that of conventional claw-pole alternators of comparable size and without magnets. This performance improvement, as demonstrated with actual 14V alternators operating at 25° C., is illustrated in FIG. 19. In FIG. 19, curve 228 represents the performance of a prototype hybrid alternator 20' according to the present disclosure having generally cuboid claw-pole fingers; and curve 232 represents the performance of a production non-hybrid alternator 20 (without rotor permanent magnets) according to the prior art having generally pyramidal claw-pole fingers.

While an exemplary embodiment has been disclosed hereinabove, the present disclosure is not limited to the disclosed embodiment. Instead, this application is intended to cover any variations, uses, or adaptations of the present disclosure using its general principles. Thus, although the disclosed rotary electric machine is a brushed type of alternator, it is to be understood that the teachings of the present disclosure could be implemented with rotors of other types of rotary electric machines, such as electric motors or brushless alternators having rotors that employ permanent magnets.

As to a further discussion of the manner of usage and operation of the present disclosure, the same should be apparent from the above description. With respect to the above description then, it is to be realized that the optimum dimensional relationships for the parts of the invention, to include variations in size, materials, shape, form, function and manner of operation, assembly and use, are deemed readily apparent and obvious to those of ordinary skill in the art, and all equivalent relationships to those illustrated in the drawings and described in the specification are intended to be encompassed by the present disclosure.

What is claimed is:

1. A rotor for a rotary electric machine, said rotor comprising:
 a first pole piece and a second pole piece each having a respective magnetic hub arranged for rotation about an axis, the first and second pole piece hubs spaced along the axis;
 a plurality of magnetic first pole fingers and a plurality of magnetic second pole fingers spaced from each other and extending between the first and second pole piece hubs, each pole finger having a proximal end and an axially opposite distal end, the first and second pole finger proximal ends connected to the respective one of the first and second pole piece hubs, the first and second pole fingers circumferentially alternating about the axis, each pole finger having a respective radially inner surface defining a cavity that extends axially from the distal end to a cavity terminus; and
 relative to each pole finger, at a respective axial position between the distal end and the cavity terminus the radial distance between the axis and the radially inner surface is substantially greater inside of the cavity than outside of the cavity and wherein a depth of the cavity diminishes along a length of the cavity in an axial direction with the distal end of the cavity having a greater depth than the cavity terminus.

2. The rotor of claim 1, wherein relative to each pole finger, the cavity terminus is located between the proximal end and the distal end.

3. The rotor of claim 1, wherein relative to each pole finger, the radial distance between the axis and the radially inner surface inside of the cavity is greater at a first axial location which is between the distal end and the cavity terminus than at a second axial location which is between the first axial location and the cavity terminus.

4. The rotor of claim 1, wherein each pole finger has circumferentially opposite leading and trailing edges, and the respective cavity is located between the leading and trailing edges.

5. The rotor of claim 1, wherein relative to each pole finger, the cavity has a generally triangular shape in an imaginary plane perpendicular to the axis.

6. The rotor of claim 1, wherein the cavity terminus of each pole finger defines a cavity apex.

7. The rotor of claim 1, wherein relative to each pole finger, at the respective cavity terminus and distal end, the radially inner surface at locations outside of the cavity are radially equidistant from the axis.

8. The rotor of claim 1, wherein each pole finger defines a radially outer surface, the respective pole finger having a radial thickness between the radially inner surface and the radially outer surface, the radial thickness at a first location outside of the cavity being greater than at a second location inside of the cavity.

9. The rotor of claim 8, wherein each pole finger has circumferentially opposite leading and trailing edges, and the first location is circumferentially between the cavity and one of the leading and trailing edges of the respective pole finger.

10. The rotor of claim 8, wherein the first location is between the proximal end and the cavity terminus of the respective pole finger.

11. The rotor of claim 1, wherein each pole finger has circumferentially opposite leading and trailing edges, the respective radially inner surface extends circumferentially between the leading and trailing edges, and the leading and trailing edges are substantially parallel with the axis.

12. The rotor of claim 1, wherein, magnetically, the first pole fingers are N pole fingers and the second pole fingers are S pole fingers, and further comprising at least one magnet disposed between a circumferentially adjacent pair of N and S pole fingers, the magnet having opposite N and S pole faces, the magnet N pole face interfacing the N pole finger, the magnet S pole face interfacing the S pole finger.

13. The rotor of claim 1, wherein each pole finger has circumferentially opposite leading and trailing edge side surfaces and the respective radially inner surface extends circumferentially between the leading and trailing edge side surfaces; and
further comprising at least one magnet disposed between the interfacing leading and trailing edge side surfaces of a pair of circumferentially adjacent first and second pole fingers and having magnetically opposite pole side surfaces, each magnetically opposite pole side surface abutting one of the pole finger leading and trailing edge side surfaces substantially along the entire length of the respective pole finger between the proximal and distal ends thereof.

14. The rotor of claim 1, further comprising an excitation coil disposed about the axis and located between the first and second pole piece hubs, with N and S magnetic polarity designations of the first and second pole piece hubs being selectively determined by a chosen electric current flow direction through the excitation coil.

15. A rotary electric machine comprising:
the rotor of claim 1;
a stator surrounding the rotor; and
a housing connected to the stator, the rotor supported by the housing for rotation relative to the stator.

16. The rotor of claim 1 wherein relative to each pole finger, the cavity has a width that varies in a direction perpendicular to an axial direction, the width being greater at a first axial location which is between the distal end and the cavity terminus than the width at a second axial location which is between the first axial location and the cavity terminus.

17. The rotor of claim 1 wherein relative to each pole finger, the cavity has a generally triangular shape in an imaginary plane parallel to the axis.

18. A rotor for a rotary electric machine, said rotor comprising:
a pair of magnetic, first and second pole pieces each having a respective hub, the first and second pole piece hubs spaced along an axis and having first and second pluralities of pole fingers, respectively, each of the first and second pluralities of pole fingers spaced from the other and distributed about the axis to define a substantially cylindrical outer rotor surface, each pole finger having a base attached to its respective first or second pole piece hub and extending towards the other pole piece hub, each pole finger of one of the first and second pluralities of pole fingers terminating at a tip positioned proximate the bases of a pair of pole fingers comprising the other of the first and second pluralities of pole fingers,
wherein each pole finger tip is provided with a radially inwardly open cavity having a length that extends in an axially inward direction from the tip towards the base of the respective pole finger to a cavity terminus, the cavity having a width dimension extending between opposite edges of the respective pole finger in a direction generally perpendicular to the axis, and a depth dimension extending generally radially into the respective pole finger, at least one of the cavity width and depth dimensions diminishing along the cavity length in the axially inward direction.

19. The rotor of claim 18, wherein, magnetically, the first pole fingers are N pole fingers and the second pole fingers are S pole fingers, and further comprising at least one magnet disposed between a circumferentially adjacent pair of N and S pole fingers, the magnet having opposite N and S pole faces, the magnet N pole face interfacing the N pole finger, the magnet S pole face interfacing the S pole finger.

20. A rotary electric machine comprising:
the rotor of claim 18;
a stator surrounding the rotor; and
a housing connected to the stator, the rotor supported by the housing for rotation relative to the stator.

21. The rotor of claim 18 wherein the cavity width dimension diminishes along the cavity length in the axially inward direction.

22. The rotor of claim 18 wherein the cavity depth dimension diminishes along the cavity length in the axially inward direction.

23. The rotor of claim 18 wherein both the cavity width dimension and the cavity depth dimension diminishes along the cavity length in the axially inward direction.

24. A rotor for a rotary electric machine, said rotor comprising:
a first pole piece and a second pole piece each having a respective magnetic hub arranged for rotation about an axis, the first and second pole piece hubs spaced along the axis;
a plurality of magnetic first pole fingers and a plurality of magnetic second pole fingers spaced from each other and extending between the first and second pole piece hubs, each pole finger having a proximal end and an axially opposite distal end, the first and second pole finger proximal ends connected to the respective one of the first and second pole piece hubs, the first and second pole fingers circumferentially alternating about the axis, each pole finger having a respective radially inner surface defining a cavity that extends axially from the distal end to a cavity terminus;
relative to each pole finger, at a respective axial position between the distal end and the cavity terminus the radial distance between the axis and the radially inner surface is substantially greater inside of the cavity than outside of the cavity; and
wherein relative to each pole finger, the cavity has a width that varies in a direction perpendicular to an axial direction, the width being greater at a first axial location which is between the distal end and the cavity terminus than the width at a second axial location which is between the first axial location and the cavity terminus.

25. A rotor for a rotary electric machine, said rotor comprising:
- a first pole piece and a second pole piece each having a respective magnetic hub arranged for rotation about an axis, the first and second pole piece hubs spaced along the axis;
- a plurality of magnetic first pole fingers and a plurality of magnetic second pole fingers spaced from each other and extending between the first and second pole piece hubs, each pole finger having a proximal end and an axially opposite distal end, the first and second pole finger proximal ends connected to the respective one of the first and second pole piece hubs, the first and second pole fingers circumferentially alternating about the axis, each pole finger having a respective radially inner surface defining a cavity that extends axially from the distal end to a cavity terminus;
- relative to each pole finger, at a respective axial position between the distal end and the cavity terminus the radial distance between the axis and the radially inner surface is substantially greater inside of the cavity than outside of the cavity; and
- wherein relative to each pole finger, the cavity has a generally triangular shape in an imaginary plane parallel to the axis.

* * * * *